United States Patent [19]
Deal et al.

[11] 4,081,375
[45] Mar. 28, 1978

[54] FILTER BELT CONSTRUCTION

[75] Inventors: Douglas O. Deal; Michael E. Miller, both of Bellevue, Ohio

[73] Assignee: Sam Stein Associates, Inc., Sandusky, Ohio

[21] Appl. No.: 792,430

[22] Filed: Apr. 29, 1977

Related U.S. Application Data

[63] Continuation of Ser. No. 659,483, Feb. 19, 1976, abandoned.

[51] Int. Cl.$^2$ .............................................. B01D 33/04
[52] U.S. Cl. .................................. 210/122; 198/834; 198/837; 210/400; 210/416 R; 210/DIG. 8
[58] Field of Search ................. 210/77, 167, 400, 401, 210/406, DIG. 8, 122, 416; 162/348; 209/307; 198/834, 847

[56] References Cited
U.S. PATENT DOCUMENTS

| | | | |
|---|---|---|---|
| 2,720,973 | 10/1955 | Gross | 210/401 X |
| 3,049,236 | 8/1962 | Cohen de Lara et al. | 210/400 X |
| 3,197,030 | 7/1965 | Black | 210/400 |
| 3,332,556 | 7/1967 | Hirs | 210/406 |
| 3,347,378 | 10/1967 | Arnold et al. | 210/400 X |
| 3,485,379 | 12/1969 | Hutson | 210/400 |
| 3,502,116 | 3/1970 | Crawford | 210/499 X |
| 3,506,128 | 4/1970 | Pashaian et al. | 210/400 |

*Primary Examiner*—William A. Cuchlinski, Jr.
*Attorney, Agent, or Firm*—Baldwin, Egan, Walling & Fetzer

[57] ABSTRACT

A filter is provided for removing particles entrained in a liquid, this filter comprising an endless fine mesh filter belt which is relatively short and which moves slowly over a supporting plurality of generally cylindrical rolls. This belt is a single layer of generally delicate woven metallic mesh and is provided with special means for moving and tracking the belt. This moving and tracking structure includes a link belt endless chain outside of each longitudinal side edge of the belt, these chains being rigidly attached over the adjacent edge of the belt. The belt can be held to its desired path around all of the supporting rolls and, preferably, over a suction box and past a cleaning point and returning to a starting point with no sensing devices, no special tracking rolls or tenter rolls, without powered devices, and with a minimum of close tolerance machining.

7 Claims, 19 Drawing Figures

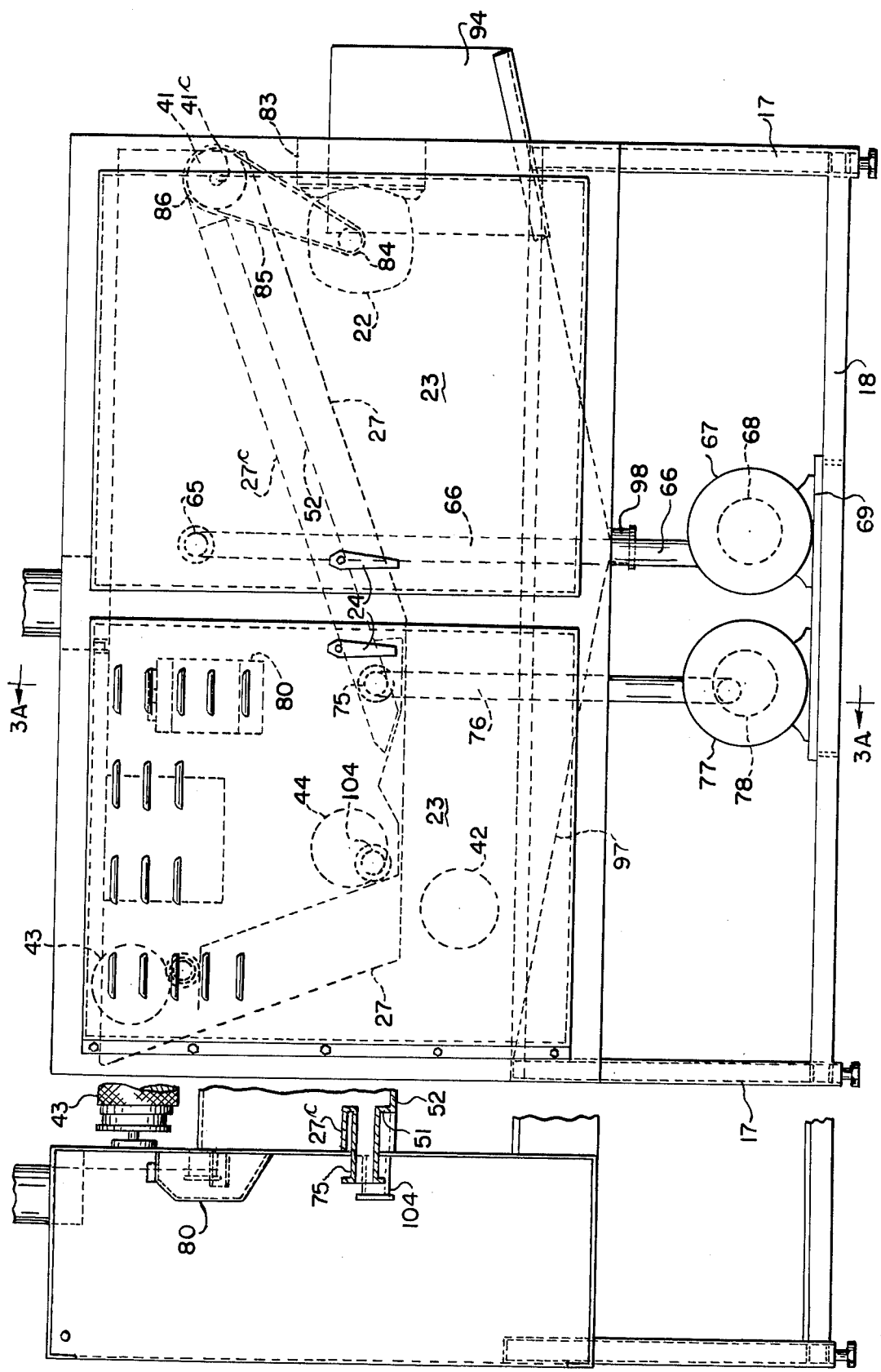

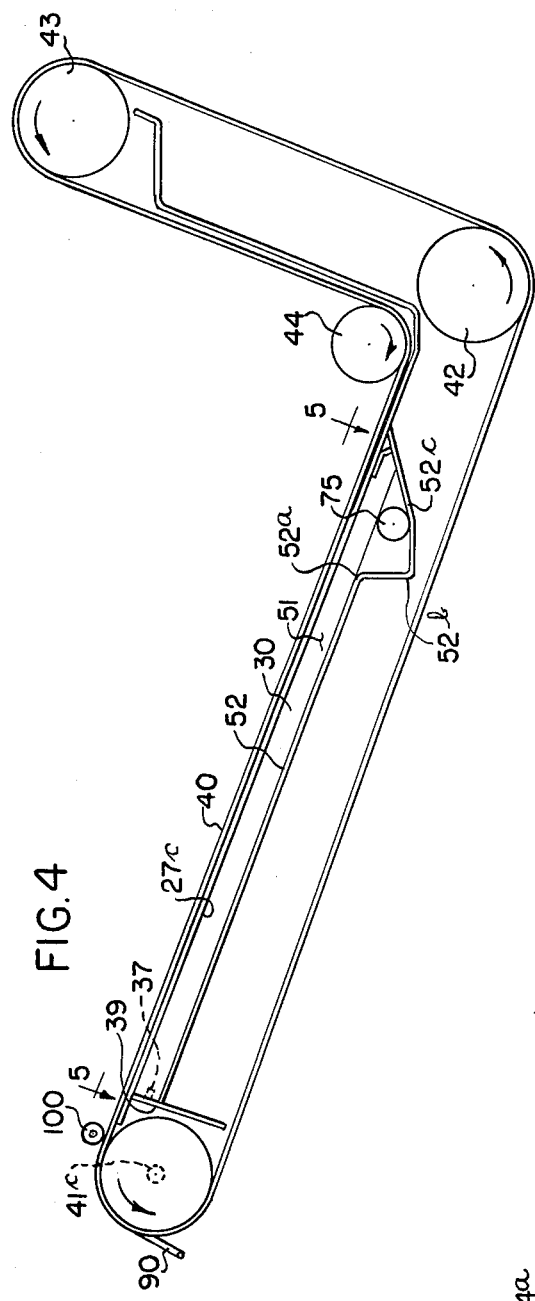
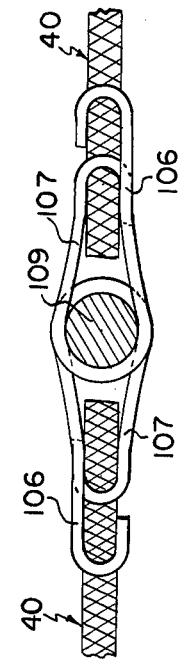
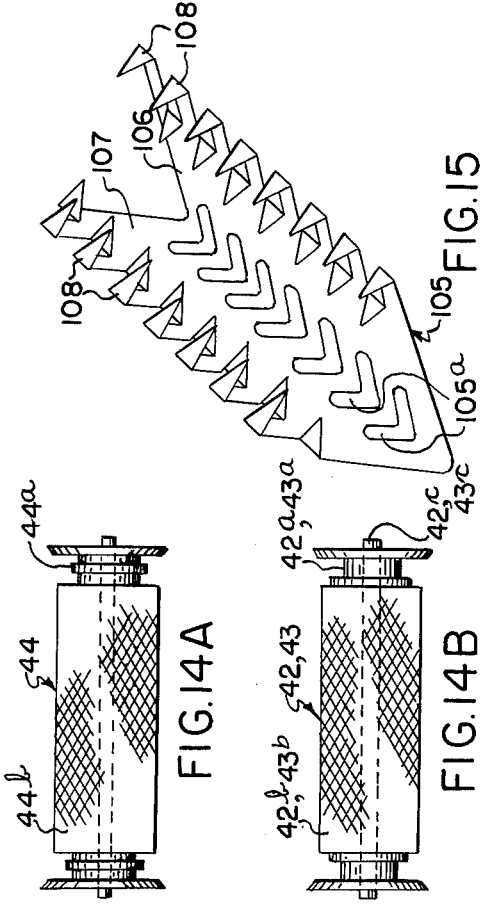
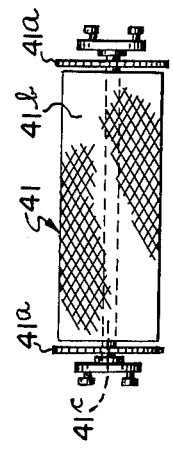

FILTER BELT CONSTRUCTION

This is a continuation of application Ser. No. 659,483, filed Feb. 19, 1976, now abandoned.

BACKGROUND OF THE INVENTION

In many cases the useful life of vegetable cooking oil can be extended by removing sedimentary solids from the oil. Many components, e.g., salt or eggs, of product coatings, whether batter or breading, can cause oil problems such as accelerated free fatty acid build-up. In additiion, charred particles can transfer a char taste to the oil, and very fine charred particles may give a premature charred color to the oil. The solution to these problems is removal of the sedimentary solids, whether crumbs or finely divided suspended particles, before these problems occur.

If suspended particles are allowed to accumulate in a fryer, black specks may appear on the surface of the product. It is a universal standard among food processors that these specks do not appear on any product. The solution to this problem is particle removal by filtration before the problem can occur.

Another area of concern is the fact that crumb accumulation, wherein heavier particles settle out of the oil, can adversely affect the performance of the fryer. It is interesting that this is true whether the fryer is directly or indirectly heated. With either heating method, crumb accumulation can adversely affect heat transfer.

In one type of directly heated fryer, wherein tubes passing through the oil may be gas fired or contain electrical heating elements, crumbs accumulating on the bottom of the fryer may build up and envelop the immersed tubes so that heat transfer from the tubes to the oil is decreased and oil is not heated adequately for frying. At the same time, tubes may overheat and burn through, a dangerous situation due to fire hazard. Another tube of fryer may have a heat transfer medium circulating through the tubes. This type is vulnerable to lack of heat transfer, but not to burnout. Finally, the seldom used type of fryer incorporating direct firing on a nominally flat bottom is especially vulnerable to both low heat transfer and burnout. It is important to note that some deep fat fryers have been available with a mechanism to remove any solids which settle to the bottom of the fryer, but even this mechanism cannot remove suspended solids.

In fryers which employ a remote heater and circulate the frying oil from the heater to the fryer continuously, if the circulation tubes in the heater suffer an accumulation of sediment, heat transfer will be reduced and fryer performance decreases. In addition, sediment can accumulate in transfer piping, particularly at elbows, to the point where the fryer is completely inoperative. Once again, continual removal of sedimentary solids solves the problem.

Over the years several approaches have been developed to filter frying oil. The simplest of all is the sediment basket. This unit consists of a tank into which is inserted a "basket". This basket consists of a framework supporting a wire screen which does the filtering. Oil enters the top of the basket, the crumbs are trapped by the wire screen and the semi-clean oil is pumped out of the bottom for re-use. Although this system is very simple, it is objectionable. First, the hot oil is circulated over the collected crumbs, normally for the length of the work shift, the crumbs continue to cook and char. The oil is circulating through the sediment basket is continually exposed to these charred crumbs and picks up a taste and a dark color. Second, the oil level in the circulation tank may be above the basket at the end of the shift. Thus, the sediment may spill over the basket and not be filtered. Third, the wire screen used must have openings large enough so that they do not plug too rapidly, thus the filtering action cannot trap a very large proportion of the suspended fines. These continue to circulate with the detrimental effects noted above, oil discoloration and black specks. When raised from the tank for emptying, the hot sediment in the basket can be very dangerous to personnel.

Another filter applied to fryer oil filtration is the plate and frame filter which employs filter paper inserted between each of a series of plates and frames. Every work shift or more frequently, the filter must be disassembled, the filter paper being discarded along with the sediment collected — a time consuming operation. Then the plates and frames are cleaned before the filter can be reassembled, and the filter paper inserted again.

Often fine particles tend to block these filters rapidly, in as little as one or two hours, rendering the filter inoperative until cleaned. When the filter is blocked up during the work shift, it is necessary to disassemble it, clean out the plates, reassemble the filter and insert the paper. This procedure takes 20 to 30 minutes. Unfortunately, during this time when the filter is out of operation, the piping lines can become plugged. These filters have the disadvantage of running the hot frying oil over the collected sediment, as with the sediment basket.

To eliminate the exposure of the frying oil to the sediment collected on the filter during a work shift, a filter which replaces the active filtering surface on demand came into use. In this style of filter a roll of filter paper is mounted at one end of the unit. The end of this paper is then threaded over a conveyor belt and out the filter discharge. The paper carrying conveyor belt is designed so that a shallow pocket is formed in the center with high edges at conveyor belt sides and at support rolls, with all high edges essentially horizontal. The filter paper conforms to the pocket shape. Hot dirty oil is deposited in the pocket, the oil passing through the paper while sediment is collected on the paper. As sediment collects, it becomes more and more difficult for the oil to pass through the paper, and the level of oil rises. Eventually, the oil rises to a height in the pocket where a level sensor is activated. Then the filter paper with the collected sediment is indexed out of the filter and clean filter paper is introduced into the active filter area. The filtering action may or may not be interrupted during the paper change cycle. The sediment and dirty paper are collected in a container for disposal. Because the oil passes through the paper by gravity, hence with very little pressure, the sediment collected on the paper is neither thick nor compact. Since a pocket in the center is formed for filtering, the edges of the paper cannot be utilized. Also, fine particles of sediment tend to block off the paper very quickly. These factors combine to make for high paper usage. Usage of one to three rolls per shift, each roll 250 yards long, is not unusual. As with the plate and frame filter, there will always be the expense of filter paper and the loss of oil absorbed by that paper. At today's prices employing this style filter can cost the operator very dearly.

One other style of filtration has come into use over the past few years. This type of filter is called the vibratory separator. Basically, what happens with the separator is that oil is dropped from above onto a vibrating screen. Ideally, the oil passes through the screen and the crumbs vibrate to a discharge position for collection. However, to function properly for a particular type of crumb, the screen must be balanced one way. To handle another type of crumb — say the operator changes from standard breading to flour, the balance must be reset. This separator seems to handle "hard" crumbs fairly well, like those from standard breading, but "soft" crumbs such as might come from other material are more difficult to vibrate successfully. Oil losses are very high with this type of filter. The frying oil is aerated while dropping onto the vibrating screen and is further aerated by the vibrating screen. Aerating can be very detrimental to oil quality by causing more rapid oxidation thereof.

The filter of this invention incorporates a continuous fine mesh stainless steel wire belt, sometimes called filtercloth, through which the oil is circulated. The fine mesh wire belt catches the particles, and the cleaner oil is returned to the cooking operation. As particles collect on the belt, oil level increases, and at a predetermined level, the belt is indexed to present a cleaner area of belt over the active filter area. During indexing, the sediments stripped from the belt and collected are disposed of. The oil flow through the belt is assisted by suction created by a positive displacement pump. This suction provides several advantages. The height of the sediment collected is considerably higher than in the gravity type filter above, thus the particles themselves are put to work as a layer of filtering medium, filtering smaller and smaller particles. The suction aids in compacting the collected sediment, thus reducing the amount of oil trapped within the sediment when the sediment cake is stripped from the belt.

Perhaps the most important feature in this unit is that for most operations no filter paper is required. Thus, a large expense is eliminated. In addition, expense of the oil lost in absorption by filter paper is eliminated.

For those operations which do require filter paper, a provision for paper usage in an additional paper layer may be incorporated into the filter. For these applications paper usage will be less than that required on a gravity flow type, because of the suction feature and full utilization of paper width.

Further, the oil is introduced below the surface of the oil above the filter belt. As a result, any possibilities for aeration of the oil have been greatly reduced.

An object of the present invention is to provide a filter for removing the sediment in hot cooking oil by passing the dirty oil through an endless fine mesh filter belt and indexing the belt intermittently as it becomes clogged with the sediment so as to present a cleaner section of the belt over the suction opening.

Another object of the invention is to provide an economical and dependable means for driving and guiding or tracking a delicate endless fine mesh filter belt in a generally L-shape path over a suction box, past a cleaning point, and returning the belt to the starting point, either continuously or in intermittent starts and stops, while insuring long belt life. The belt and its driving and guiding means are so arranged that a belt may be easily removed and replaced by another belt, either for repair or for replacement, if necessary, with a belt of different mesh.

Other objects and advantages of the invention will be apparent from the description and the specification and the drawings and the essential features thereof will be set forth in the appeded claims.

In the drawings,

FIG. 3 is a side elevational view taken along the line 3—3 of FIG. 2;

FIG. 3A is a partial sectional view taken along the line 3A—3A of FIG. 3;

FIG. 4 is a somewhat simplified elevational view showing the working parts of FIG. 1;

Figure 1:
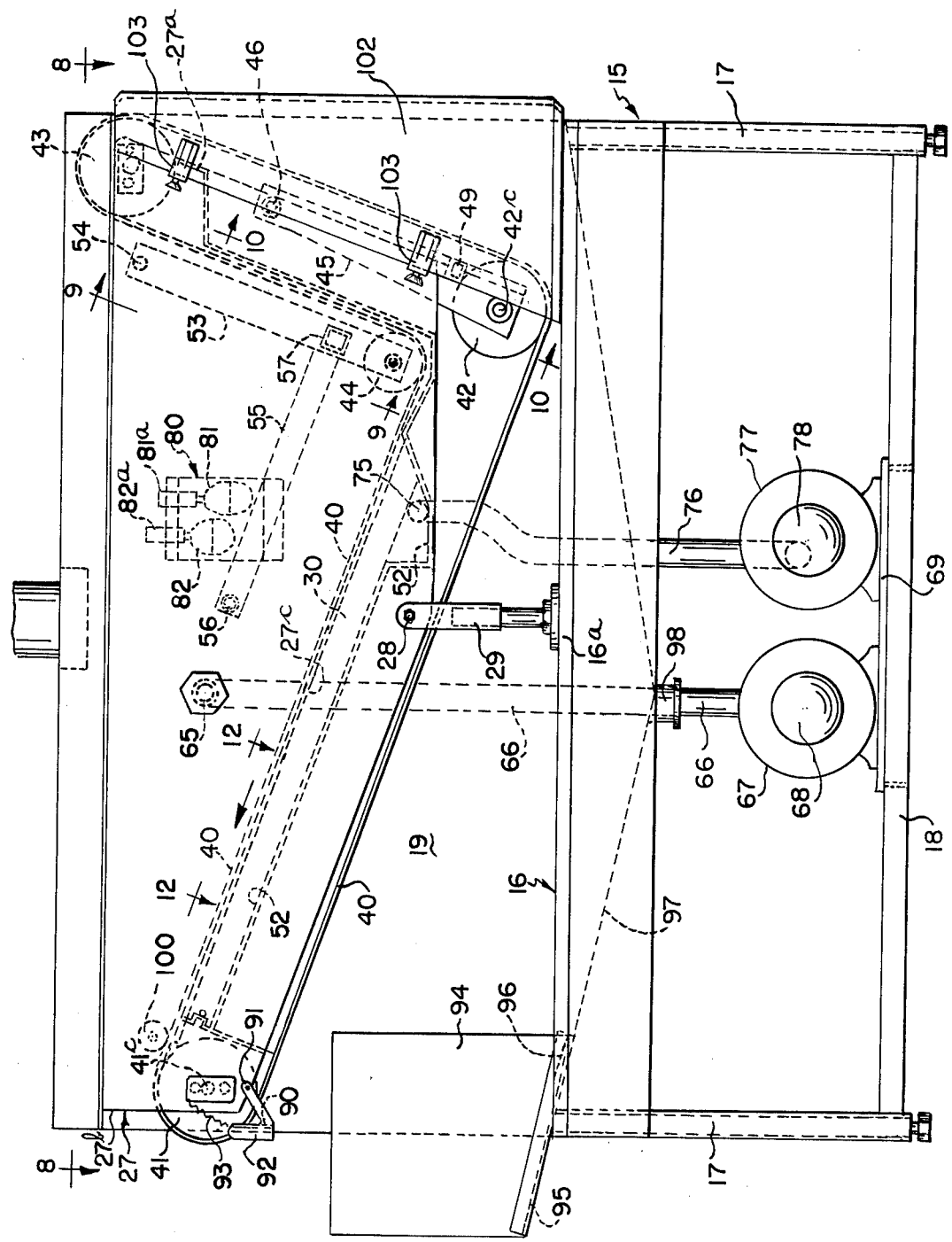
FIG. 1 is a side elevational view of the filter of this invention, the same being taken along the line 1—1 of FIG. 2.
Figure 9:
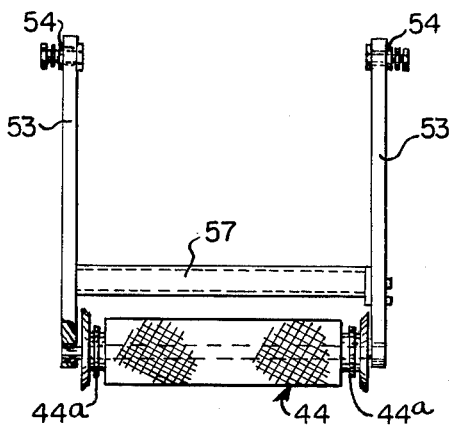
Figure 10:
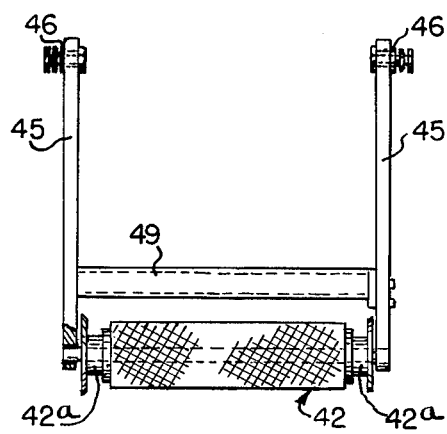
Figure 12:
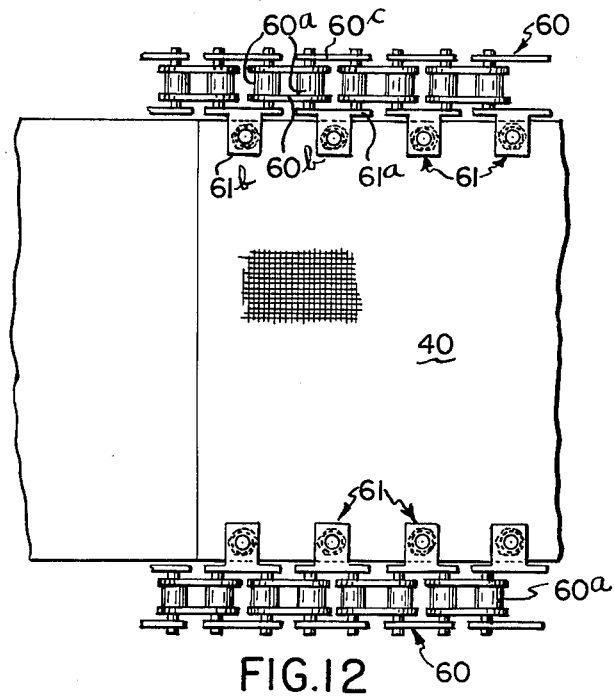
Figure 13:
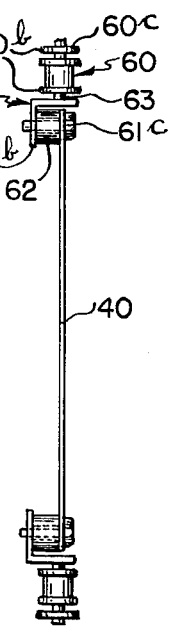
Figure 11:
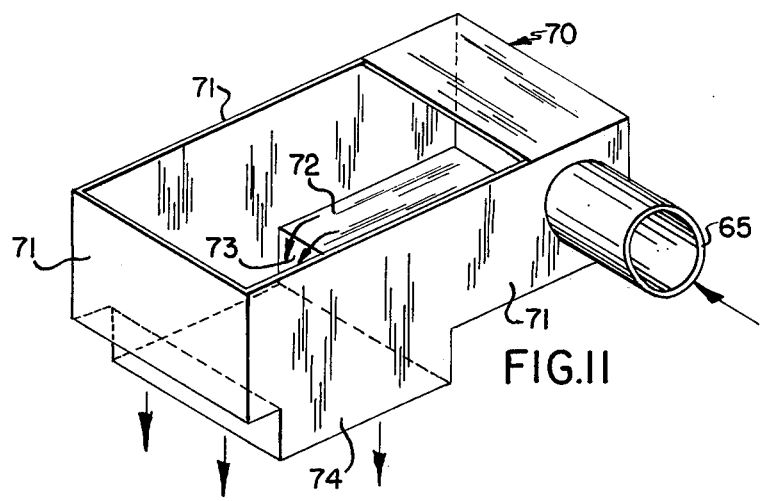

FIGS. 9 and 10 are views taken along the lines 9—9 and 10—10, respectively, of FIG. 1;

FIG. 11 is a perspective view of a dispersion box which may be attached to the dirty oil input pipe seen in the middle of FIG. 1;

FIG. 12 is a top plan view, slightly enlarged, taken along the line 12—12 of FIG. 1;

FIG. 13 is an end elevational view of FIG. 12;

FIG. 14 is an elevational view of the drive roll as seen in FIGS. 1 and 4;

FIG. 14A is an elevational view of the roll at the inside corner of the L-shape belt path as seen in FIGS. 1 and 4;

FIG. 14B is an elevational view of the roll at the outside corner of the L-shape belt path and of the roll at the top right end of the L-shape path as seen in FIG. 1 and FIG. 4;

FIG. 15 is a perspective view of a belt lacing, enlarged, in open position, used to join the fine mesh woven wire belt; while FIG. 16 is a side view of the belt lacing in place on a fully laced belt.

Figure 2:
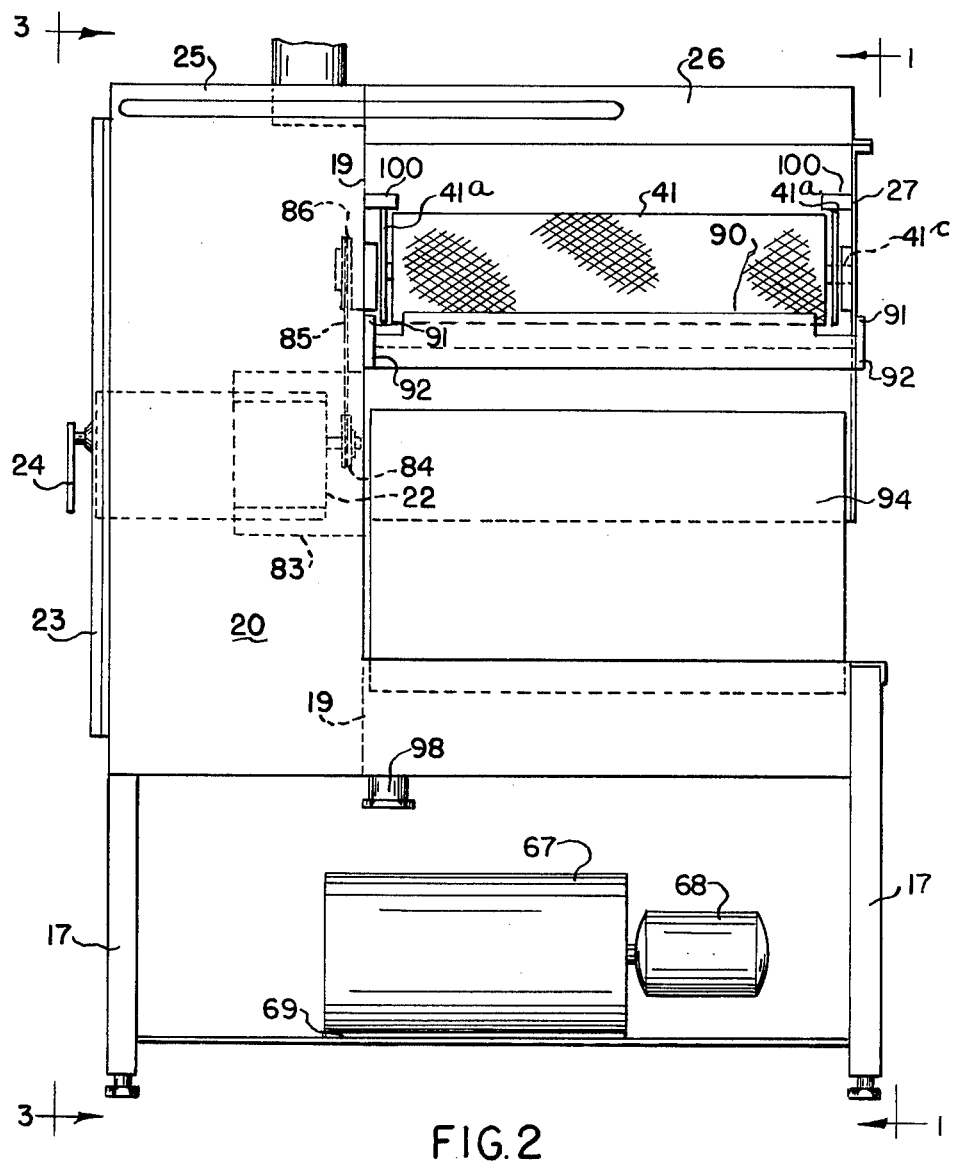
FIG. 2 is an end view of the same taken at the left-hand end of FIG. 1.

Referring now to FIGS. 1, 2 and 3, a cabinet 15 is provided including an apparatus support level 16 supported rigidly on four corner posts 17 which rest upon a floor or other supporting surface. The legs are braced near the bottom by braces 18 extending along the two parallel longer sides. A separating wall 19 extends vertically back of the working parts as seen in FIG. 1, and as shown in FIG. 2, this extends down to the bottom of the cabinet walls which form an enclosure 20 which houses a motor drive 22 as clearly seen in FIG. 2. Two doors 23, seen in FIG. 3, open outwardly at the opposite ends of the cabinet and are held in closed position by latches 24. The top of the cabinet is closed by a fixed top 25 extending over the space 20 and a pivoted top 26 which is pivoted just above the partition 19 and which may be extended upwardly from the position shown in FIG. 2 to open up the right-hand side of the cabinet.

The working structure of the filter comprises a reservoir to contain the hot dirty oil before filtering. This reservoir comprises as one side wall the partition wall 19 previously mentioned and on the opposite parallel longer side a side wall 27 which extends generally in triangular form from one end 27a to the other end 27b. This side wall 27 is supported at 28 by an adjustable support 29 which is secured to a support member 16a extending the length of the cabinet.

Figure 7:
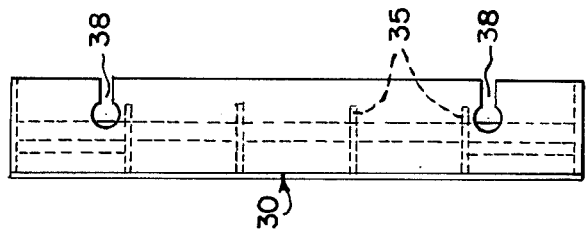
FIG. 7 is an end view of the same.
Figure 5:
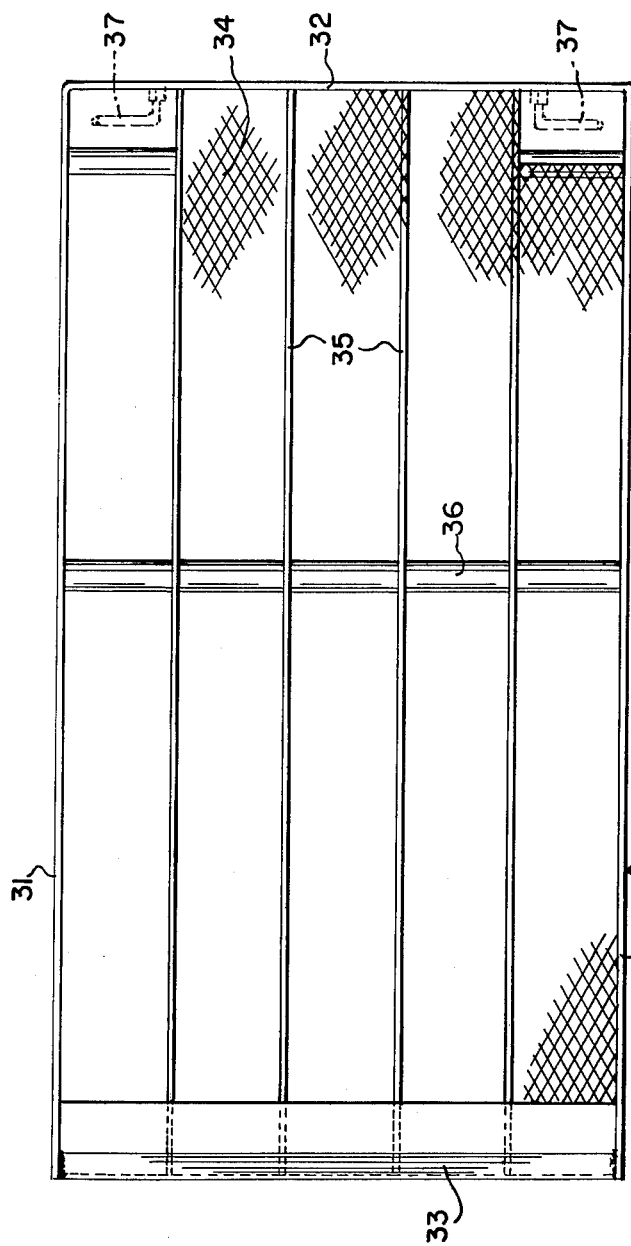
FIG. 5 is a top plan view of the suction box taken along the line 5—5 of FIG. 4.
Figure 6:
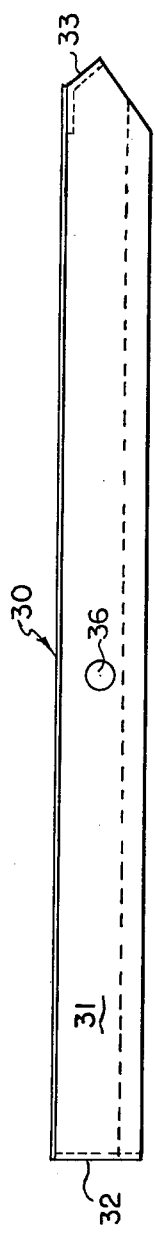
FIG. 6 is a side elevational view of the same.

The reservoir is mainly imperforate as will be described. The longer inclined wall 27c in the bottom of the reservoir has a through opening for the purpose of receiving a suction box 30 which is clearly shown in FIGS. 5, 6 and 7, and the opening is the same size and shape as FIG. 5. This suction box has parallel vertical sides 31 connected along one end by a vertical wall 32, and at the other end a short inclined wall 33. The box has an open top which is closed by an expanded metal structure 34 which is secured by welding to the side and end walls 31, 32 and 33 and also welded to longitudinal braces 35 extending the length of the box. Other supporting cross bars 36 are provided also. The suction box 30 is held in the position shown in FIGS. 1 and 4 by locking levers 37 which are received in grooves 38 in the end wall 32 and engage in a wall 39 of a supporting structure mounted in the side walls 19 and 27 of the reservoir into which the levers 37 have threaded ends for securing the suction box firmly in position.

Figure 8:
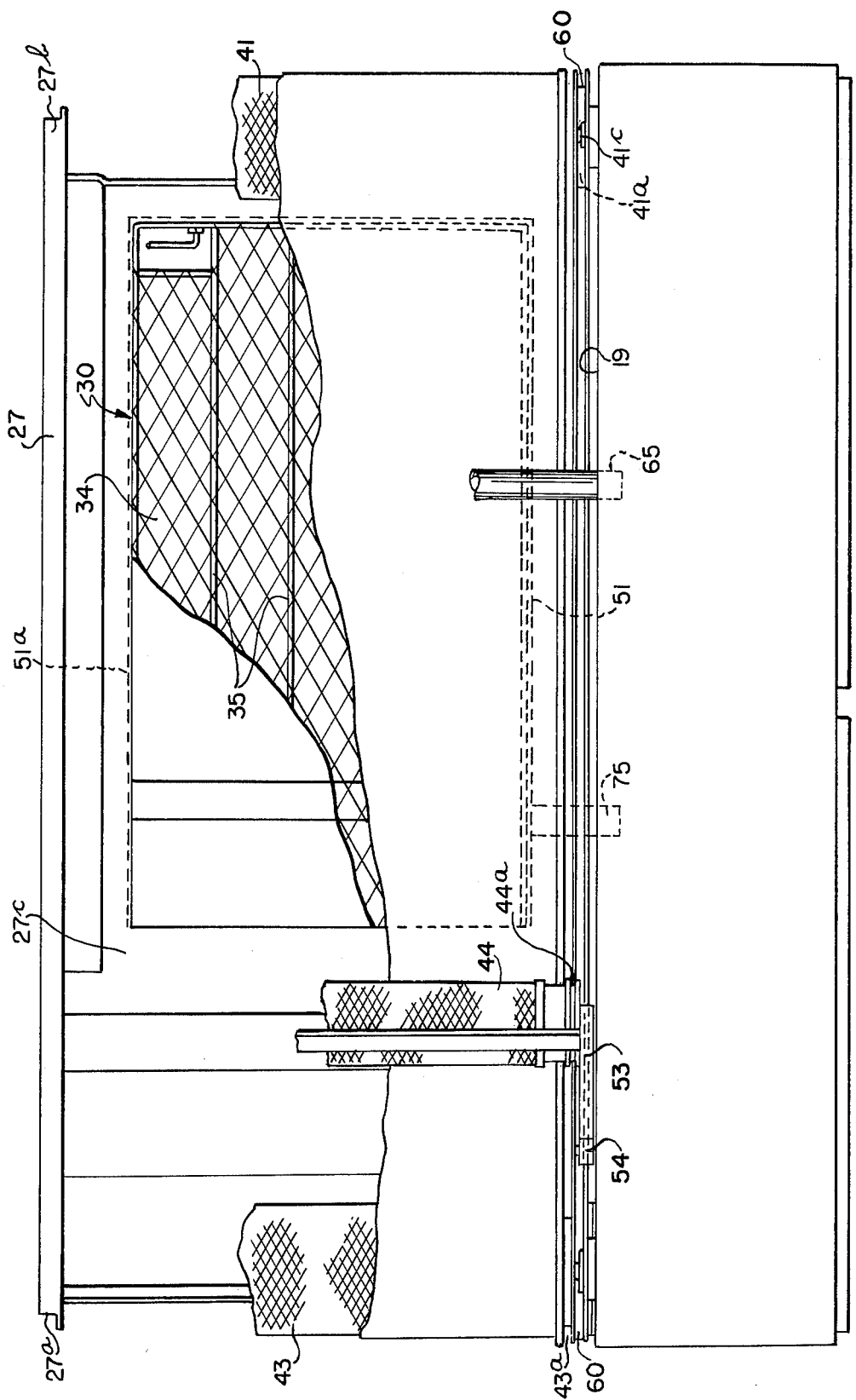
FIG. 8 is a top plan view taken along the line 8—8 of FIG. 1.

This construction permits removal of the suction box 30 for internal cleaning when necessary. The through opening in the reservoir bottom wall 27c which receives the suction box 30 is enclosed by the suction box well seen mainly in FIG. 4. The wall 39 extends downwardly from wall 27c to form the upper end wall of the suction box well. At the level equivalent to the bottom of the suction box, the well bottom wall 52 is rigidly attached and extends diagonally downward parallel to reservoir bottom wall 27c to a suitable transverse line 52a. The bottom wall 52 is bent to a vertical position at 52a and extends vertically downward to a line 52b where it is bent to a horizontal position. One more bend at 52c directs it at an upward angle matching the end of the suction box until it reaches reservoir bottom wall 27c, where it is rigidly fastened. The sides of the suction box well are closed by side walls 51 and 51a as seen in FIG. 8. The configuration of the lower end of the suction box well forms a suitable entry point for the oil suction pipe 75 through wall 51 as later described.

An endless fine mesh filter belt 40 is provided which travels closely across the top of, and in sliding contact with, the suction box 30 when moved in the direction of the arrow shown in FIG. 1 and which travels over a drive roll 41 at the outer end of the longer leg of an L-shape pattern, then inclines downwardly to pass around a tension roll 42, outside of the hot oil reservoir, then inclines upwardly along the shorter leg of the L-shape to pass over a top roll 43 and then downwardly inside of the reservoir to pass under an idler roll 44 at the inside of the apex of the L-shape. This filter belt is woven of stainless steel wire, and may have any of a number of different combinations of mesh size, wire diameter, and style of weaving, depending upon results desired.

Belts have been tested with mesh openings as large as 200 microns square, and as small as 60 microns square. Belts are available with even finer meshes and may be utilized as will later appear. The wires of the tested belts have been as small as 0.007 inches diameter, and may be larger or smaller as required or desired. Each roll is generally cylindrical and mounted for rotation on an axial shaft.

For ease of operation in moving the endless belt in and out of the structure, the roll 42 as seen in FIGS. 1 and 10 is mounted for rotation in the lower ends of parallel arms 45 which are pivoted at their upper ends at 46. The roll 42 serves as a tension member for the belt 40, powered by gravity only. The center of rotation 42c of roll 42 is always driven by gravity to assume a position vertically under pivot points 46 in arms 45, thereby imparting tension to the belt 40, depending upon the original angle from the vertical made by the arms 45 as shown in FIG. 1 and upon the weight of the assembly. The cross bar 49 serves to hold the arms 45 in rigid spaced relationship. The roll 44 has the ends of its support shaft mounted in the lower ends of arms 53 which may swing about pivots 54 at the upper ends of the arms which are mounted, like the pivots 46 on the walls 19 and 27 of the reservoir. Two rigid stop arms 55 are pivotally mounted at 56 on the reservoir walls and engage against a bar 67 which is fixed rigidly between the arms 53. To remove or replace an endless belt 40, the arms 55 are swung upwardly counterclockwise about pivots 56, to a position horizontally left of pivots 56 in FIG. 1. The arms 53 carrying the roll 44 are then disconnected from the walls 27 and 19 at the pivot points 54 and are temporarily removed. Now the endless belt 40 appears to be loosely draped over rolls 41 and 43, hanging below roll 42 with no tension applied by roll 42. The removal of the adjustable support 29 permits the removal of the endless belt 40 by lifting it free of rolls 41 and 43, and moving it sideways over wall 27. This direction is to the right in FIG. 2. The replacement of the belt follows the above description in reverse order of action.

If desired during cleaning, the arms 55 may be swung counterclockwise as above, then arms 53 carrying roll 44 may be swung clockwise about pivots 54 to a position vertically above pivots 54. The belt 40 is now loosely draped over rolls 41 and 43, and may be further raised between them for access to the suction box 30. It may be seen that the suction box can be removed for cleaning if necessary, without removing the belt.

The filter belt 40 is equipped with an endless roller chain on each side of the belt for the purposes of moving the belt when required and guiding the belt continuously. This is shown in FIGS. 12 and 13 where the chains 60 are attached by bracket members 61b to the opposite edges of the belt 40. It will be seen that two rollers 60a are secured together at opposite ends of links 60b by links 60b. Then, adjacent pairs of rollers are connected on one side of each chain by links 60c so as to make a continuous chain. Adjacent rollers 60a of two different pairs of such rollers are joined on the opposite side of the chain to a flange 61a of the link 61 and this link has an outstanding flange at right angles shown at 61b through which passes a threaded bolt 61c and, as seen in FIG. 13, between the belt 40 and the flange 61b is inserted a spacer 62 which is so chosen that the plane of the belt 40 passes through the axis of the pin 63 about which the rollers 60a rotate. This structure makes it possible for the chain and the belt to bend first in one direction and then in the opposite direction in passing over the rolls 41, 42, 43 and 44 without any strain on the belt 40 except minor bending stresses around the rolls. To guide this chain, the rolls 41, 42, 43, 44 are specially constructed as will presently appear.

This filter belt 40 is one of the essential elements of this invention. It is difficult to obtain tracking of this belt because of its slow speed of travel, say from about 2 feet to about 5 feet per minute; and because of the shortness of the length of the belt as compared with its width. The belt here shown is about two times its width between adjacent supporting rolls, in this case the belt has a width of just short of 2 feet and the length is approximately 4 feet between the roll 41 and the roll 44, or between the roll 41 and the roll 42. A Fourdrinier belt, for instance, travels about 30 to about 150 feet per minute with supporting rolls up to 50 feet apart and such a faster traveling long belt is easier to track. One cannot use the usual mechanical tracking of a belt in this case, such as the crowning of the support rolls, or the use of "squeeze" rolls which have a plurality of flexible projections from the surface of the roll, half of them on each end of the roll inclined toward the center of the belt so as to squeeze the belt into the proper line. The use of such tracking rolls is prevented in the present instance because such rolls would foul up by contact with the oil product. Other forms of tracking mechanism which include edge location sensors and either tenter rolls or center pivoted tracking rolls are not usable because both depend upon friction between rolls and belt surfaces to achieve tracking. They also localize stresses in the belt at the correction point, which is intolerable in the configuration of this invention. The belt shown herewith is also subject to intense temperature changes, say from 60° to 90° F. outside of the oil bath to 400° F. inside the oil bath. Note also that a linear doctor blade is used to clean the collected material off of the present belt. Some prior filtering belts have utilized rods extending across the belt to keep it flat and to absorb transverse strain but this would not work in the present instance because of the use of the doctor blade. In the present embodiment, the drive sprockets 41a of the drive roll as seen in FIG. 14 have teeth narrower than those usually provided and in one embodiment permit a side movement of the chain with respect to the drive sprocket of 0.080 inches to 0.100 inches. The side movement is necessary to avoid overstraining the delicate woven wire belt while guiding it. The extreme temperature changes encountered by the belt in its short travel from hot oil to room air, and later back to oil, induce dimensional changes in the width of the belt on the order of 0.050 inch. At the same time, the drive roll 41 is affected on only part of its periphery at a given time by contact with the hot belt leaving the oil, which tends to warp the roll. Further, the unmeasurable different effects of oil flow in the filter reservoir and air drafts outside the filter add more belt and chain distortion. Finally, the normal manufacturing and assembly tolerances of the rolls, shafts, chain and belt add more variations, of minor dimension but still of some effect. The combination of all these, means that the belt assembly is continually changing dimension and configuration, a weaving or snaking action coupled with widening and narrowing. The belt can be pulled sideways to guide it, but may buckle if pushed. However, if an attempt is made to guide it too closely, then some combination of the above variables may result in tension being applied to both sides at the same time by the chain side links 60b bearing on the outside of their sprockets 41a. This can tear the belt at the points where bolts 61c pass through the belt. Thus the sprockets 41a are narrower than those normally supplied for the chain, to minimize any transverse pushing effect on belt edges, and also to eliminate the possibility of transverse tension being applied to both edges at the same time.

A similar problem can be encountered at roll 44, even though it is always submerged in hot oil while operating. If the narrow tooth sprockets were used on roll 44, they would guide the belt satisfactorily, but would not compensate for another problem. This new problem is the fact that the length of the two chains on either side of the belt are normally slightly different due to manufacturing tolerances, and this may be accentuated by the difference in oil flow in the filter reservoir. Thus if one chain is exactly the right length between rolls 41 and 44, the other will almost always be too long. Either one can be the right length at one time or another. The slack chain then does not carry its share of the driving load, and the belt can tend to arc sideways, leading to tracking problems at the drive roll. Roll 44 is therefore equipped with narrow discs 44a as seen in FIG. 14A in the positions equivalent to the sprocket positions on roll 41. These discs 44a are machined to a diameter equivalent to the root diameter of the sprocket which would have been used, and the chain rollers ride on these discs. The center line of the chain pins 63 and the plane of the belt are then at the periphery of roll 44. Now the chains are free to move circumferentially around the discs 44a so that both chains may be under equal tension. A beneficial additional result of this construction is that because the chain rollers 60a are not socketed between sprocket teeth, there is no tendency for sediment to build in the root of the teeth. If this happened, the pitch radius to the chain would change, and the woven wire belt would not stay in close contact with the periphery of roll 44.

The conditions at roll 42 present still another set of problems. There will always be some debris falling from the belt and chains in this area, from the run of belt between rolls 42 and 43. Any that falls on the chain would be compacted into sprocket teeth with results as described above. The discs as at 42a would alleviate that problem, but the approximately 90° wrap of the chain around such discs coupled with lack of belt support on either side of roll 42 would not be enough for chain twisting stability. Therefore, the roll hubs 42a as seen in FIG. 14B are machined into an annular slot in the chain area with bottom diameter such that the plane of the belt is at the periphery of roll 42. The slot width is such that the chain is permitted the above mentioned side movement. In this case, the edges of the links 60b and of flanges 61a of links 61 ride on the bottom of the slot, and chain twist can be controlled. Debris between the slot bottom and the chain side link edges is then no longer a problem. Roll 43 is constructed the same as roll 42 and is interchangeable. Note that this construction could be used at roll 44, but it is more expensive than that described for roll 44, and it is not necessary at roll 44 due to the belt and chain support by the suction box after roll 44.

Still another arrangement is possible and has been tested for roll 41. In this arrangement, the configuration is the same as shown in FIG. 14, except that only one of the two sprockets 41a is fixed on shaft 41c. The other sprocket 41a is free to float axially on shaft 41c while being constrained from rotating in relation to the shaft 41c. This arrangement is possible when the wire mesh belt is of heavy construction so that only one chain 60 on the same side of the belt as the fixed sprocket 41a may be used to guide the belt. With this arrangement, the single guiding chain may pull or push the belt laterally for guiding, while the other chain serves only for driving its belt side. The advantages of this arrangement, when its use is possible, are reduced initial roll construction cost and greater tolerance for fluctuation in woven wire belt width.

Also, in all embodiments, the cylindrical portion of all the rolls, that between sprockets 41a on roll 41, between discs 44a of roll 44, between annular slots 42a of roll 42 and between annular slots of roll 43, is formed of an overall perforated structure such as expanded and flattened sheet metal, shown at 41b, 44b and 42b in FIGS. 14, 14A and 14B. This is to prevent any build-up of foreign material, such as oily gum, between the filter belt and the rolls. This also makes the cleaning job easier because then one only has to turn a hose on the belt and the roll and the water will penetrate both of these elements.

It is obvious that this filter belt 40 and its tracking mechanism, as described, might be used for other filtering purposes not herein exemplified. It also could be used on a linear belt traveling between two supporting rolls rather than in the L-shape configuration shown herein in the drawings.

Hot dirty oil is pumped from a deep fat fryer into the reservoir through a tube 65 through a pipe 66 leading from a pump 67 driven by a motor 68, this pump structure being carried on a plate 69 secured between the struts 18. The tube 65 passes through the wall 19 and is sealed thereto. Preferably the pipe or tube 65 is located below the normal level of the liquid in the reservoir so as to reduce the turbulence and resulting aeration of the entering fluid. An alternate method is illustrated in FIG. 11 where the tube 65 discharges into a dispensing box 70 which has four sides 71 and a bottom 72 into which the hot oil flows from the pipe 65 and passes over a downwardly opening shoulder 73 to fall through a broad opening 74 to pass into the reservoir. Many other dispensing arrangements are possible.

To pump the oil out of the reservoir and through the suction box 30 a suction is induced in a tube 75 at the lower end of the suction box which connects by pipe 76 to a pump 77 driven by a motor 78, this structure being also mounted on the plate 69 as seen in FIG. 3. Tube 75 passes through wall 51 and is sealed thereto. This pump is a positive displacement pump and can create a suction up to about 10 inches of mercury. The result is that the hot oil is drawn out of the reservoir and through the filter screen belt 40 into the suction box and then is forced out through the pump 77 and back to the deep fat fryer.

The pump 67 is regulated for a substantially constant flow and obviously when the filter belt 40 is clean, the level in the reservoir will be lower than that which occurs later as the fine mesh belt begins to fill up with the sediment collected. A high and low level detector 80 is provided fastened to a side wall of the reservoir. This detector has a low level bulb 81 floating on the oil in the reservoir, and a high level bulb 82 floating in the reservoir also. The stem 82a connected with the bulb 82, in its uppermost position operates an electrical switch which stops the oil feed through pump 67 and starts indexing of the belt 40. This indexing is caused by a motor 22, mounted on a bracket 83 supported on one of the walls of the reservoir. This motor 22 drives a sprocket 84 which is connected by a drive chain 85 with a sprocket 86 which drives the shaft 41c on which roll 41 is mounted. This will cause the filter belt 40 to move in the direction of the arrow of FIG. 1 to carry the collected sediment over the roll 41 and to expose a cleaner section of the filter belt at the lower end of the suction box 30. Freer movement of oil through the cleaner section causes a reduction in the level of the hot fluid in the reservoir and when the bulb 81 indicates the desired lower level of the liquid in the reservoir, then the shaft 81a, operated by the bulb 81, strikes a switch at its lower level position which starts the oil feed motor and pump 68, 67 and stops the belt indexing by stopping the drive motor 22. The bulb structure shown at 80, 81, 82 is a standard manufacture of Madison Laboratories, Inc. of Madison, Conn. The indexing cycle may continue for any period from a few seconds to nearly continuous movement depending on the load of sediment in the hot oil. Under some conditions, as later described, the indexing feature may be eliminated, allowing the belt to be driven continuously.

Means is provided for removing the sediment collected on the surface of the filter belt 40 and this comprises a scraper blade 90 engaging the filter belt 40 after it passes out of the reservoir. This scraper blade is carried on brackets 92 which are mounted pivotally at 91. The blade 90 is held resiliently against the belt on roll 41 by means of a tension spring 93. This blade removes the bulk of the sediment which is dropped into a collection box 94 mounted in the cabinet and extending the full width of the filter belt 40. This box is open at the top and has four imperforate side walls and a bottom 95 which is closed except at the inner bottom edge at 96 where it has an opening covered only by expanded metal or other perforated structure. This allows the sediment material to drop into the collector box 94 and the small amount of oil in the sediment drains out the openings at 96 into a sump 97 which is an inclined structure beginning at the level of 16a and extending downwardly from both ends toward the center at 98 where a drain connection is provided which is normally plugged until it is necessary to empty the oil collected in the sump 97.

A door, seen at 102 in FIG. 1, closes the right-hand end of the filtering space and is held in position by latches 103. A drain or clean-out opening 104 for the reservoir is indicated in FIG. 3 and this is normally capped.

The operation of the filter should now be readily understood. The pump 67 is hooked up to take dirty hot oil from the deep fat fryer and the pump 77 is hooked up to deliver cleaner oil back to the deep fat fryer. Sediment is then collected on the upper surface of the filter belt 40 over the suction box 30 which gradually builds up sediment on the upper surface of the belt. The oil is pulled through the belt by the suction which compacts the particles of the sediment which are therefore collected to a higher thickness than by former methods. Thus, the particles themselves form an extra filtering layer on top of the filter belt 40, thus filtering out smaller and smaller particles. The fact that the suction compacts the collected sediment reduces the amount of oil lost with the collected sediment. It will be noted that no pocket is required in the center of the filter belt but instead the belt is flat across its entire width which is available to collect sediment. The collected particles of sediment material are regularly eliminated near the bottom of the roll 41 so that they do not remain in contact with the hot oil so as to become charred. This filter reduces the amount of oil thrown away with the sediment material collected, thus saving expensive oil.

As mentioned previously, it is sometimes preferable to drive the filter belt continuously, with no indexing. Also as previously mentioned, sediment which is in contact with hot oil for too long a period will char with undesirable results. By operating the belt continuously, the dwell time of sediment particles in oil can be kept to a minimum. Continuous operation will reduce the build-up of sediment cake on the belt as has been described, with some reduction in the percentage of fine particles removed, but this drawback can be partially offset with the use of very fine mesh belts. In some applications, the build-up of sediment cake is quite rapid, and may become excessive if the belt is driven in the indexing mode, excessive meaning that the cake extends over the chains 60 on either side of the belt. In this case, continuous movement of the belt is the preferred mode of operation to reduce sediment build-up problems at chain driving and guiding points.

A further advantage of continuous belt operation is that the belt is subject to starting stresses only once per work shift rather than intermittently throughout the shift duration. Thus, continuous operation of the belt can prolong belt life by reducing the incidence of the higher starting stresses.

It may be understood that when the belt is driven continuously, the feed pump 67 will operate continuously or nearly so. This greatly reduces the number of stopped periods for the feed pump, and the stopped periods of liquid flow to and from the feed pump. Thus, the danger of sediment settling in the described piping is greatly reduced.

Some further detail of belt construction is necessary to fully understand the novelty and importance of the belt tracking means used in this invention.

It has been mentioned that the fine mesh woven wire belt 40 is fastened to the chain 60 on either side of the belt by using bolts 61c through spaced holes near the belt edges, thence through spacers 62 and into flanges 61b of chain side links 61. Referring to FIG. 12, it may be seen that the hole spacing is determined by the chain pitch between rollers 60a, the spacing being equal to two pitches of the chain. It may also be seen that the spacer 62 is of small diameter relative to the spacing of the fastening bolts 61c. This means that the portion of the belt edge in actual contact with fastening devices is only a portion of the total belt edge, and that not all of the belt cross wires are serviceable as stress members to track the belt. Further, it may be understood that the holes through the belt 40 for bolts 61c cut through some stress wires, greatly reducing their value as lateral stress members for tracking. One point that is not obvious until explained is that the spacers must be of a material capable of withstanding the oil contact, the oil temperature and repeated temperature changes, and still not damage the belt in the area of contact. For instance, many synthetic compounds would not damage the belt but could not withstand the high temperature. Others would be dissolved or destroyed by oil contact. Stainless steel spacers would tolerate temperature fluctuations and contact with oil, but would damage the belt wires by crushing them during the tightening of bolts 61c. No soft metals are acceptable both mechanically and biologically, while still being economical enough for use. This leaves the choice of spacer materials to only a few synthetics approved by the United States Department of Agriculture and Food and Drug Administration as acceptable for direct contact with food. A Teflon material is the one chosen, having high temperature tolerance, no known solvent, regulatory agency approval for this application, and desirable mechanical properties for this application. When the bolts 61c are tightened, the wire mesh of the belt 40 "prints" into the interstices between wires, effectively locking them together so that some of the lateral strength of the cut wires is recovered, without damaging the wires. A beneficial side effect is partial sealing of the interstices against entry of oil. The belt 40 and chains 60 are assembled with both under normal driving tension, so that the three components of the finished belt, the two chains 60 and the wire mesh belt 40, are all of the same and correct pitch length. The two ends of each chain 60 are joined by standard connecting links used for this purpose, while the ends of the woven mesh wire belt 40 are joined by a stainless steel "lacing" material seen at 105 in FIGS. 15 and 16. The lacing material consists of a thin and narrow stainless steel strip which has been formed with a longer leg 106 and shorter leg 107, and with a multiplicity of points 108 of various lengths extending at right angles to its main axis. A series of obround (slightly oblong) holes is also punched along the center line of the strip, with the long dimension of the holes crosswise of the strip. Hole centers are less than twice hole length in the direction of strip length, so that metal between holes is slightly less length than hole length. The strip is then bent on longitudinal lines at the center and partially in from each edge. This forms an angle with holes 105a through the heel, and points directed inwardly from each toe as seen in FIG. 15. The angle of FIG. 15 is slipped over the end of the woven mesh belt and the points are driven through the belt from opposite sides and flattened, leaving the heel portion as a loop along the belt edge. When the two ends of the belts are brought together, the punched holes 105a through the angle heel mesh like the two halves of a hinge and a wire 109 may be slipped through the loops across the width of the belt, locking the two strips together and forming a hinge pin for the belt joint as seen in FIG. 16, and making the woven wire belt into a continuous endless loop. Note that if the belt becomes damaged, as when it is punctured by carelessly handled tools, it is possible to cut out the damaged length and lace in a new section, providing that the length of the replaced section is an integral multiple of the spacing between bolts 61c.

It can now be understood that a belt structure has been assembled which contains an essential part of its own tracking mechanism, which is built mainly of standard components and which can be repaired in the field. The roller chain 60 along opposite edges of the belt 40 furnish large, strong, easily guided members. The chains 60 are fastened by a regularly spaced multiplicity of bolts 61c to a delicate woven wire mesh belt 40. The spacers 62 distribute the fastening strength to a number of belt wires at each fastener 61c, so that as the chains 60 are tracked or guided, the belt 40 must also be tracked or guided. The location of the belt plane on the center line of the chain hinge pins 63 insures equal pitch length for both the belt 40 and the chains 60 so that working stresses are minimized during operation. The belt can be held to its desired path around all rolls and over the suction box with no sensing devices, no special tracking rolls or tenter rolls, no powered devices, and a minimum of close tolerance machining.

One further device is used in the machine to help proper tracking. It has been mentioned in reference to rolls 42 and 44 that sprockets cannot be used for tracking means on these rolls due to the possibility of sediment build-up on the sprockets under the chain rolls. The danger is also present at roll 41, but sprockets must be used to insure that chains are driven as the belt is driven. The danger is that sediment can build up to the point where a chain can "skip", thus throwing the belt into a diagonal strain. The danger is partially alleviated by the narrowness of the sprockets 41a as before mentioned. This affords a clearance space between the sprockets 41a and the chain links 60b for debris to be squeezed out by pressure from the chain rollers 60. The pressure is greatly increased as needed by hold downs 100 which are round stub bars bolted to the side walls 19 and 27 in such position that their pressure on the top of chain links 60c and 60b forces the rollers 60 into the sprocket teeth root, and expels any debris therein. The chain working strength is several hundreds of pounds per strand, so the pressure applied to the chain links can even be a multiple of that, insuring that debris is squeezed out, and that the chain does not skip sprocket teeth. The woven wire belt 40 is subjected to none of this force, and is protected from diagonal stressing.

There are several areas in the continuous filter embodiment above described wherein modifications might be made by those skilled in the art. The chains 60 used may have attachment flanges 61b at every pitch instead of alternate pitches as shown. The chain may be any of a number of stock sizes. The spacers 62 might be made of other materials acceptable mechanically and to regulatory agencies. The mesh of the belt 40 may be coarser or finer, of almost any wire size or mesh pattern. The bolts 61c may be rivets. The expanded metal roll surface may be of different pattern or percentage of opening. The sprocket 41a modification may be more or less severe, or may incorporate root configuration changes. The belt 40 may run intermittently or continuously. The physical dimensions of the unit may change. The oil dispersion system 70 may take innumerable forms. The oil level controls 80, 81, 82 may be of other manufacture and configuration. The belt cleaning means consisting of doctor blade 90 may be considerably modified in materials and configuration. Cleaning means may include the addition of pressurized air streams directed against the inside of the belt after roll 41 to assist in removing collected sediment. None of these changes detract from this invention.

The filtering apparatus herein described has been exemplified as applied to the continuous filtration of hot cooking oil. However, several other applications are also subject to its use. For instance, the filtration of wines to remove sedimentary solids, or the dewatering of slurries to recover entrained solids. Other applications will be obvious to those familiar with the art. Some applications may not include the temperature variations described, nor require the sanitary contruction incorporated in the apparatus. These other applications are mentioned to demonstrate the versatility of the invention.

What is claimed is:

1. A filter for removing particles entrained in a liquid, consisting of a supporting frame, said supporting frame comprising a housing forming a reservoir having imperforate side walls and a bottom for holding a volume of sediment-holding liquid, a major portion of said bottom of said reservoir having an inclined planar opening, a single layer endless filter belt extending closely over said opening, driving means on said frame causing passage of said filter belt across said opening and then a return run back to said opening, said belt traveling outside said reservoir at ambient temperature and inside said reservoir in hot liquid, a closed suction box beneath substantially said entire opening, means for providing a vacuum in said box, a plurality of cylindrical uncrowned belt-supporting rolls rotatably mounted in spaced parallel relation on said frame, said endless filter belt mounted to pass over said rolls moving slowly, said belt being a single layer of generally delicate metallic woven mesh between 200 microns and 60 microns square of wires as small as 0.007 inches diameter, said belt having a length between rolls about two to five times its width, means for moving and tracking said belt including a link belt endless chain outside each longitudinal side edge of said belt, each link in each of said chains rotatably supporting two parallel rollers crosswise of said filter belt, extra link means on opposite sides of said chains connecting adjacent links, a bracket member pivotally supported between adjacent links on the inside thereof, each said bracket member having a rigid flange extending at right angles over the adjacent edge of the belt, means firmly fixing said flange to said adjacent edge of said belt with the plane of said belt substantially coinciding with the plane of the rotating axes of said rollers, said filter belt being uninterrupted crosswise between said brackets on opposite sides thereof, power means for driving said chains including a drive shaft for one of said rolls and drive sprocket means on said shaft outside of said one roll, said power means driving said one roll and said sprocket means simultaneously, whereby said filter belt may track in a straight line and may bend first in one direction and then in the opposite direction if necessary, without extra strain on the belt, and a straight doctor blade may scrape collected particle material off substantially the full width of said belt.

2. A filter as defined in claim 1, said means for moving and tracking said belt including driving sprockets fixed on opposite ends of one of said supporting rolls meshing with said rollers of said chains to drive them equally thereby, and said sprockets of a thickness less than the length of said rollers of said chains whereby said tracking of said belt may be accomplished by a pulling force directed outwardly from one side or the other of said belt and sideways pushing forces on said belt edges are eliminated.

3. A filter as defined in claim 2, said means for moving and tracking said belt including smoothly rimmed discs fixed on opposite ends of one or more of said supporting rolls on which may ride said rollers of said chains whereby said tracking of said belt may be accomplished by a pulling force directed outwardly from one side or the other of said belt and pushing forces on said belt edges are eliminated, and said chains are allowed to equalize in tension by slipping around the periphery of said discs.

4. A filter as defined in claim 2, said means for moving and tracking said belt including annular square bottomed grooves in the hubs on opposite ends of one or more of said supporting rolls in which may ride said side links of said chains whereby said tracking of said belt may be accomplished by a pulling force directed outwardly from one side or the other of said belt and pushing forces on said belt edges are eliminated, and said chains are allowed to equalize in tension by slipping around the periphery of said annular square bottomed grooves.

5. A filter as defined in claim 2 in which said supporting frame comprises a housing forming a reservoir having imperforate side walls and a bottom for holding a volume of sediment-holding liquid, at least a part of said bottom of said reservoir having an inclined planar opening, said endless filter belt extending closely over said opening, said driving and tracking means causing passage of said filter belt across said opening and then a return run back to said opening, a closed suction box beneath said opening, means for providing a vacuum in said box, means for detecting when said liquid in said reservoir reaches a predetermined level, means responsive to said detecting means for causing said driving and tracking means to move said filter belt a distance up said inclined opening whereby to present a cleaner portion of said filter belt over said opening, and including means for introducing said sediment-holding liquid into said reservoir below the level of the liquid therein, whereby to reduce turbulence and to reduce aeration of said liquid.

6. A filter as defined in claim 2 in which said supporting frame comprises a housing forming a reservoir having imperforate side walls and a bottom for holding a volume of sediment-holding liquid, at least a part of said bottom of said reservoir having an inclined planar opening, said endless filter belt extending closely over said opening, said driving and tracking means causing passage of said filter belt across said opening and then a return run back to said opening, a closed suction box beneath said opening, means for providing a vacuum in said box, means for detecting when said liquid in said reservoir reaches a predetermined level, means responsive to said detecting means for causing said driving and tracking means to move said filter belt a distance up said inclined opening whereby to present a cleaner portion of said filter belt over said opening, and wherein said filter belt travels in a generally L-shape pattern with its apex at the bottom and with an operating run and a return run including a drive roll at the outer end of one leg of said L-shape pattern and a tension roll at the outside of said L-shape at the apex and with a top roll at the outer end of the other leg of said L-shape, and with an idler roll at the inside of said L-shape pattern at the apex.

7. A filter as defined in claim 1, said means for moving and tracking said belt including driving sprockets on opposite ends of one of said supporting rolls meshing with said rollers of said chains, one of said sprockets fixed on its associated end of said one roll, the other of said sprockets is restrained from rotation relative to its associated end of said one roll but is free to move axially of said associated roll, to drive them equally thereby, and said sprockets of a thickness less than the length of said rollers of said chains whereby said tracking of said belt may be accomplished by a pulling force directed outwardly from one side of said belt or sideways pushing force directed inwardly toward the same side of the belt.

* * * * *